United States Patent
Horstmann et al.

(10) Patent No.: US 12,085,954 B2
(45) Date of Patent: Sep. 10, 2024

(54) STEERING METHOD FOR AN AGRICULTURAL MACHINE

(71) Applicant: Maschinenfabrik Bernard Krone GmbH & Co. KG, Spelle (DE)

(72) Inventors: Jan Horstmann, Rheine (DE); Andre Tenkleve, Spelle (DE); Mathias Rabenschlag, Spelle (DE)

(73) Assignee: Maschinenfabrik Bernard Krone GmbH & Co. KG, Spelle (DE)

( * ) Notice: Subject to any disclaimer, the term of this patent is extended or adjusted under 35 U.S.C. 154(b) by 274 days.

(21) Appl. No.: 17/735,140

(22) Filed: May 3, 2022

(65) Prior Publication Data
US 2022/0350344 A1 Nov. 3, 2022

(30) Foreign Application Priority Data

May 3, 2021 (DE) ...................... 10 2021 111 360.1

(51) Int. Cl.
*G05D 1/00* (2024.01)
(52) U.S. Cl.
CPC ................................. *G05D 1/0278* (2013.01)
(58) Field of Classification Search
CPC .. G05D 1/0278; G05D 1/0212; A01B 69/001; A01B 69/008
See application file for complete search history.

(56) References Cited

U.S. PATENT DOCUMENTS

| 7,860,628 | B2 * | 12/2010 | Lange ................... G01C 21/20 701/25 |
|---|---|---|---|
| 2002/0193928 | A1 | 12/2002 | Beck |
| 2007/0050117 | A1 | 3/2007 | Kitzler et al. |
| 2007/0255470 | A1 | 11/2007 | Diekhans et al. |
| 2009/0204281 | A1 | 8/2009 | McClure et al. |
| 2018/0373264 | A1 | 12/2018 | Madsen et al. |

FOREIGN PATENT DOCUMENTS

| EP | 3 146 825 | 3/2017 |
|---|---|---|
| JP | 2021029230 | 3/2021 |

* cited by examiner

*Primary Examiner* — Jacob M Amick
*Assistant Examiner* — Charles J Brauch
(74) *Attorney, Agent, or Firm* — Gudrun E. Huckett

(57) ABSTRACT

In a steering method for an agricultural machine, the agricultural machine is steered by track steering action independent of GNSS position data along an initial travel track in a working region until a headland adjoining the working region is reached at an exit point of the initial travel track. The agricultural machine is automatically steered by turn steering action, steering it based on an actual position determined based exclusively on GNSS position data, through the headland until an entry point of a target travel track in the working region is reached. The agricultural machine is steered by track steering action along the target travel track. The agricultural machine automatically detects a transition from a travel track of the working region into the headland and/or a transition from the headland into a travel track of the working region and switches accordingly between turn steering action and track steering action.

14 Claims, 3 Drawing Sheets

STEERING METHOD FOR AN AGRICULTURAL MACHINE

BACKGROUND OF THE INVENTION

The present invention relates to a steering method for an agricultural machine and to an agricultural machine that is automatically steerable by means of a track steering action that is independent of GNSS position data as well as by means of a turn steering action, the latter configured to steer the agricultural machine based on an actual position of the agricultural machine determined based exclusively on GNSS position data, wherein the agricultural machine is steerable by means of the track steering action along an initial travel track in a working region until a headland adjoining the working region is reached at an exit point of the initial travel track; is steerable through the headland by means of the turn steering action until an entry point of a target travel track at the working region is reached; and is steerable along the target travel track by means of the track steering action.

Agricultural machines, in particular harvesters, nowadays comprise in general systems that at least assist the user in steering or even completely autonomously steer the agricultural machine. In this way, an optimal efficiency can be achieved and, at the same time, the user or driver can be relieved. Usually, a cultivated area or a field is worked track by track, wherein the agricultural machine works across a certain constructively defined width along the length of a track until the end of the field is reached. Then, a turning process is carried out in a region that is called headland and can be located outside of the field or is a border region of the field that has been worked beforehand. After the turning process, a next track, e.g., a neighboring track, is worked on. For optimal efficiency, a turning process is desired by means of which the next track can be reached fast as well as precisely.

In order to achieve the required precision, nowadays systems are used in general in which the position of the agricultural machine is determined by RTK (real-time kinematic). The position determination is based on GNSS (global navigation satellite system), wherein, in addition to signals of satellites, signals of a terrestrial base station with GNSS receiver are also evaluated however. The signals of the base station enable a correction of the purely satellite-based position measurement. The latter is subject to unavoidable temporal drift entailing deviations in the range of a few meters. Heading for a track requires however typically a precision in the range of a few decimeters, for example, maximally 30 cm. Even though by means of RTK precision in a single digit centimeter range can also be realized, this causes comparatively high costs however, in particular for an RTK-capable GNSS system of the agricultural machine, for its own base station, or for fees of a correction service provider. Also, there is a high dependency on components that are required in addition to a normal GNSS system. Aside from an GNSS-based control, it is however also possible, for example, to detect optically or mechanically (for example, by a row sensor) structures such as a crop edge, plant rows or the like in order to control the agricultural machine. However, in particular in the headland, such a control is problematic for achieving sufficient precision because the headland in general is unstructured. An alternate or simultaneous use of GNSS-based control and optical control has already been proposed in the prior art.

U.S. 2002/0193928 discloses a device for position determination of an agricultural vehicle, with a controller that receives a satellite-based first position signal and a second position signal which is determined based on the position of the vehicle relative to the crop being harvested. The controller is provided with quality information regarding the quality of both position signals and weights the position calculation based on the first position signal and the second position signal in accordance with the quality information.

EP 3 146 825 A1 discloses a driver assistance system for an agricultural machine for working an area provided with crop along a working travel track wherein a track guiding control is provided which generates steering commands for the agricultural machine in the context of a turning process in a headland for sensor-based driving along a turn travel track between an initial travel track and a target travel track displaced thereto and with opposite travel direction. A crop edge sensor is provided for detecting the crop edges of the field crop and the track guiding control carries out in the context of the turning process an alignment process in which it detects a reference crop edge of the field crop by means of the crop edge sensor and generates based thereon steering commands for the machine for alignment of the machine to the target travel track.

U.S. 2007/0050117 discloses a steering system for a vehicle with track following system for determining a travel route wherein the track following system effects by means of at least one data processing device an automatic steering action of the vehicle. The track following system comprises at least a first, for example, GPS-based, travel route detection system and at least a further travel route detection system, for example, an optical system. The travel route detection systems are coupled by at least one data processing device in such a manner that one can switch between the travel route detection systems.

Object of the invention is to enable an inexpensive and precise steering action of an agricultural machine in the region of a headland.

SUMMARY OF THE INVENTION

In accordance with the invention, this is achieved by a steering method with the steps:

steering the agricultural machine by means of a track steering action that is independent of GNSS position data along an initial travel track in a working region until a headland that adjoins the working region is reached at an exit point of the initial travel track;

automatically steering the agricultural machine through the headland by means of a turn steering action, which steers the agricultural machine based on an actual position of the agricultural machine that is determined based exclusively on GNSS position data, until an entry point of a target travel track in the working region is reached; and steering the agricultural machine along the target travel track by means of the track steering action.

The object is further solved for the agricultural machine of the aforementioned kind in that the agricultural machine is configured to automatically detect at least one transition between a travel track and the headland and, based thereon, to automatically switch between turn steering action and track steering action.

Advantageous embodiment are disclosed in the respective dependent claims.

A steering method for an agricultural machine is thus provided, comprising the steps:

steering the agricultural machine by means of a track steering action that is independent of GNSS position data along an initial travel track in a working region until a headland that adjoins the working region is reached at an exit point of the initial travel track;

automatically steering the agricultural machine through the headland by means of a turn steering action, which steers the agricultural machine based on an actual position of the agricultural machine that is determined based exclusively on GNSS position data, until an entry point of a target travel track in the working region is reached; and steering the agricultural machine along the target travel track by means of the track steering action.

The agricultural machine can be characterized also as an agricultural work machine. This includes expressly also trailed devices with a tractor and at least one machine pulled by it or a trailer. The agricultural machine can be in particular a harvester such as a forage harvester, a combine, a baler, or forage wagon. However, it could also be, for example, a tractor with a rotary tedder, a plow, a fertilizer spreader, a slurry spreader or the like. In the context of the steering method, the agricultural machine travels, on the one hand, through a working region, for example, a cultivated area or a field or a part thereof, wherein, for simplifying matters, the terms cultivated area and field are used in the following interchangeably, i.e., have the same meaning. In this working region, in general work such as plowing, fertilizing, mowing, tedding, harvesting, or the like takes place at least temporarily. On the other hand, the agricultural machine travels through a headland that borders the working region and, more precisely, is formed at the edge thereof. The headland can be positioned, for example, outside of the field or it can be a border region of the field that, at the beginning of work, is worked first, for example, harvested first.

Initially, the agricultural machine is steered along an initial travel track in the working region. A travel track, which could be referred to also as working track, corresponds in this context to the travel path of the agricultural machine through the working region wherein usually it is provided that the entire area or at least most of the area of the working region is worked step-by-step by traveling along individual travel tracks, wherein the travel tracks optionally can also be spatially arranged in succession. Normally, the agricultural machine travels along a track, turns then in the headland, and travels along the successive track in opposite travel direction. The respective travel track is normally approximately straight but could also be curved, at least in sections. Each travel track can be assigned a width that can correspond to the effective working width of the agricultural machine, i.e., the width that can be effectively worked on transversely to the travel direction. In case of a combine or a forage harvester, this would be, for example, the width of the harvesting attachment. In case of a baler or a forage wagon, the width of the track corresponds usually to the working width of the preceding process, for example, swathing or mowing with swathing. As a function of the actually performed work of the agricultural machine as well as of the preceding working steps, different widths of the travel track can be defined in different ways, and the invention is not limited in this regard in any way.

For an effective working, the displacement of two successive travel tracks corresponds, transverse to the travel direction, usually approximately to the aforementioned width (for example, working width) so that each part of the working region is precisely engaged once. However, deviations therefrom are conceivable also so that a distance is provided between two spatially adjacent travel tracks or so that these travel tracks have an overlap. Normally, two spatially adjacent travel tracks also follow each other temporally in the context of work. It should also be noted that a travel track that is traveled along must not be mandatorily (completely) worked on, even though this is the rule. The agricultural machine is steered along the initial travel track wherein the term "steering" here and in the following refers to maintaining or changing a travel direction, normally by adjusting a steering angle of at least one steerable axle. In this sense, it is also "steering" when in a straight track the agricultural machine moves straight forward constantly. In addition, steering can also include an adjustment of the travel speed.

The agricultural machine is steered along the initial travel track by means of a track steering action that is independent of GNSS position data. This means no position data of a global navigation satellite system are utilized by the track steering action for determining how the agricultural machine is to be steered. The steering process can be generally considered as an adjustment control process in which an essentially "ideal" nominal travel line that is to be achieved represents the reference value, a measured actual travel line represents the control variable, and the steering adjustments (for example, of the steering angle) represents the actuating variable. Along the initial travel track, the actual travel line, which can also be viewed as temporal sequence of actual positions, is thus adjusted independent of GNSS position data. Even though it is possible that the agricultural machine receives such GNSS position data continuously or repeatedly, they are however not utilized in the track steering action. The track steering action can be realized by hardware components as well as by software. Possible configurations of the track steering action will be discussed infra. They utilize largely an existing structure of the working region that determines the course of the (initial) travel track, for example, furrows, plant rows, a crop edge, and the like. Even though "one" track steering action is mentioned, it is possible that different steering principles are used that follow each other temporally, wherein, for example, the actual positions can be determined in different ways. Insofar, one could also correctly speak of "at least one track steering action". Inasmuch as different steering principles are utilized, they have however in common their independence from GNSS position data. The track steering action is used for steering the agricultural machine up to the exit point of the initial travel track, i.e., until the headland is reached. The exit point corresponds to the end of the initial travel track at which the agricultural machine exits from the track and enters the headland. Instead of an exit point, one could also speak of an exit position or an exit region.

Subsequently, automatic steering of the agricultural machine through the headland is carried out by means of a turn steering action until the entry point of a target travel track at the working region is reached. Steering is carried out automatically so that the turn steering action can also be referred to as automatic steering action. As long as the turn steering action is active, steering of the agricultural machine is carried out without input of a user or driver. Normally, the turn steering action is realized exclusively by components that are installed in the agricultural machine. It can be realized by hardware components as well as by software. The turn steering action steers the agricultural machine based on a detected actual position which can be referred to as a control variable with regard to control technology. According to the invention, this actual position is determined based exclusively on GNSS position data. The corresponding turn steering action steers the agricultural machine through the headland to the entry point of the target travel track. The entry point corresponds to the start of the target travel track at which the agricultural machine exits the headland and enters the track. Instead of an entry point, one can also speak of an entry position or entry region.

As a whole, a turn maneuver is carried out that normally corresponds effectively to a 180° turn. As already mentioned above, the target travel track normally follows spatially the initial travel track immediately or at a minimal distance; however, this is not important with respect to the invention. A considerable distance between the two travel tracks could be provided also. The terms "initial travel track" and "target travel track" serve only for terminological differentiation and characterization of the temporal sequence and contain no information in regard to the spatial arrangement of the travel tracks within the working region.

After traveling through the headland and reaching the entry point of the target travel track, the agricultural machine is steered by means of the track steering action along the target travel track. This process does not essentially differ from steering along the initial travel track and is therefore not explained again. Due to the performed turning process, the agricultural machine travels along the target travel track, but travels usually in opposite direction to the initial travel track.

The invention is based on the principal recognition that traveling through the headland can be performed within a comparatively short period of time, for example, between 5 seconds and 20 seconds, and in general corresponds only to a minimal portion of the entire traveled travel distance. In case that corrected GNSS position data are used which rely on fee-incurring corrective signals, the costs can be kept low when the utilization of the corrective signals is limited to traveling through the headland. On the other hand, the GNSS position data are not suitable or only badly suitable for steering along a travel track, for example, because the course of the travel track or of plant rows of a crop can be irregular and can require numerous, hardly foreseeable steering input. Also, the precision of self-corrected GNSS position data may be inter alia insufficient for following the travel track in an ideal manner. On the other hand, steering along the travel tracks can be realized by means of other methods which cannot be used or only used with difficulty in the headland; this will be explained in the following.

Preferably, the turn steering action steers the agricultural machine based on an actual position that is determined based exclusively on uncorrected GNSS position data of the agricultural machine. In this context, "uncorrected" means that position data are concerned that are based exclusively on signal reception from navigation satellites but not on signal reception from a terrestrial base station. The imprecisions of uncorrected GNSS position data that make them unusable as a basis for a permanent precise steering action are caused mainly by a temporal drift that leads to deviations in the range of a few meters across longer periods of time, for example, several minutes or even hours. Accordingly, uncorrected GNSS position data are not suitable for determining an absolute position with high precision. On the other hand, relative positions within a limited period of time, in which the aforementioned drift has now or hardly any effect, can be determined with high precision, for example, precise within a few centimeters. In order to steer from the exit point of the initial travel track to the entry point of the target travel track, a knowledge of the relative positions is sufficient so that within the temporally comparatively quickly performed turning process the uncorrected GNSS position data can be used. They also enable a precise steering action to the entry point of the target travel track, whether along a simple, for example, semicircular travel line, or along a complex, for example, keyhole-shaped curve. On the other hand, the uncorrected GNSS position data are not suitable for steering along a travel track because working of a travel track (for typical dimensions of a working region) takes much longer than the turning process, for example, takes several minutes. Correspondingly, the drift would be significantly more noticeable in this context. Along the travel tracks, steering can be done by means of other methods.

Activation as well as deactivation of the turn steering action can be carried out manually by the driver. Alternatively, it is however preferred that at least a transition between a travel track and the headland is automatically recognized and, based thereon, switching between turn steering action and track steering action is automatically performed. On the one hand, the exit point of the initial travel track can be automatically recognized and, based thereon, the turn steering action can be activated automatically. The track end can be detected, for example, by means of optical image recognition, or it can be recognized in that a row sensor no longer detects crop, in that the motor load suddenly drops, in that a front attachment is lifted etc. In case of a forage harvester, a change in position of the pressure rollers, pivoting of a delivery chute to the opposite side (which is triggered by the user) or the like can be detected. In case that manual steering is performed in the initial travel track, a change of the steering angle or a change of the orientation of the agricultural machine (for example, by means of a gyroscope) can be detected also. Of course, also other detection mechanisms are conceivable. The entry point of the target travel track can be identified, for example, by means of image recognition or mechanically by means of a row sensor. However, depending on the condition of the working region, the use of active sensors, for example, Lidar, is also possible.

Preferably, a nominal travel line from the exit point of the initial travel track to the entry point of the target travel track is determined prior to the agricultural machine then being steered through the headland in accordance with the previously determined nominal travel line. This means that the nominal travel line, describing a path from the first travel track to the target travel track that is considered optimal, is completely determined prior to the agricultural machine beginning its travel through the headland. When determining the nominal travel line, different parameters can be taken into account, for example, the effective working width of the agricultural machine which in general determines the displacement of the two travel tracks, the minimum curve radius that can be realized by the agricultural machine, the dimensions of the headland, the orientation of the boundary of the working region etc. For the parameters that concern the headland and the working region, a field record system can be used, for example. In this context, even uncorrected GNSS position data can be used as approximately correct absolute position because, for example, the dimensions of the headland or the course of the boundary of the working region will not change (significantly) within a few meters. During travel across the headland, the turn steering action compares the actual position repeatedly with the nominal travel line and steers the agricultural machine in order to minimize a deviation from the nominal travel line. This means that the nominal travel line (or a position along the latter) forms the reference value while the actual position represents the control variable that is to be correspondingly adjusted.

In this context, preferably based on a detected actual position at the exit point of the initial travel track, a plurality of nominal positions along the nominal travel line are determined and the turn steering action compares the respective actual position with the nominal positions upon traveling through the headland. This means that in accordance with the (corrected or uncorrected) GNSS position data, an actual position at the exit point of the initial travel track is determined and, based thereon, the nominal positions, essentially points along the path, are determined along the nominal travel line. These nominal positions are correct within the reference system that is provided by the initially determined actual position. In case of uncorrected GNSS position data, the nominal positions lose their validity due to the described drift after a longer period of time. Within the comparatively short turning process, the respective actually determined actual positions can however be compared with these nominal positions. Since the correct approach of the entry point of the target travel track is particularly important, usually one of the nominal positions corresponds to this entry point.

According to an embodiment, the track steering action is operated at least temporarily manually. This means that a user or driver steers the agricultural machine manually, for example, by means of a steering wheel or a joystick. In this context, he can, for example, visually control the travel line of the agricultural machine. This is possible easily when work is done with sufficient daylight and the working region is structured in a manner so that one can easily detect the course of the travel tracks. Of course, the driver could also use sensors for orientation.

In order to improve precision and to relieve the driver, if present, it is preferred that the travel steering action at least temporarily is done automatically. This means that the track steering action steers the agricultural machine without manual input, essentially "autonomously". This can also be realized, for example, by an adjustment control process in which a nominal travel line is preset and the conformity of an actual position therewith is checked. For determining the actual position, the agricultural machine comprises at least one sensor. The nominal travel line and the actual position must not be compared necessarily two-dimensionally. When the agricultural machine, for example, is to travel along a furrow or a plant row, it is sufficient to monitor its (one-dimensional) position transverse to the travel direction of the agricultural machine.

In particular, the track steering action can orient itself along a structure of the working region. In particular, it can be a structure of a crop which is standing in the working region. The crop, i.e., the crop plants planted in the working region, has in general structures that correspond to the course of the travel tracks. In particular, the crop typically comprises a plurality of approximately parallel plant rows that can serve for orientation. In addition or as an alternative, also a boundary of the crop can be used for orientation. For example, a harvester can be steered such that it just barely still detects the actual crop boundary. But also without a crop being present, other structures can be utilized, for example, furrows along which the track steering action can orient itself.

As a function of the condition of the working range, it is also possible to use different sensors, for example, mechanical or optical sensors, active or passive sensors. According to an embodiment which can be used when working in the crop, the track steering action orients itself in at least one travel track by means of a mechanical row sensor. Such a row sensor detects mechanically two neighboring plant rows by means of sensing elements and registers, for example, by means of the deflection of the sensing elements, positional changes in relation to the plant rows. When a sensing element is more strongly deflected because it approaches a plant row, a steering signal counteracting this is produced by means of the track steering action. The sensing element can be arranged, for example, at a front attachment of the agricultural machine.

According to another embodiment, the track steering action orients itself in at least one travel track by means of an optical image recognition system. In this context, an image of the environment of the agricultural machine, in particular of the region in front of the agricultural machine, is recorded with at least one camera (that can also be infrared-sensitive, for example). In this image, certain structures are identified, for example, plant rows, furrows, a crop boundary or the like, by a software and utilized for determining the actual position of the agricultural machine.

Since steering in the headland is automatically performed and based exclusively on (optionally uncorrected) GNSS data, there is a high dependency on the correctness of the position data or their evaluation. In exceptional cases, the turn steering action could operate faultily so that the nominal travel line is not traveled as intended. In these cases, an additional measure can be helpful. In accordance with such a configuration, it is provided that, independent of the GNSS position data, secondary position data are determined and the turn steering action within the headland is deactivated when the GNSS position data deviate excessively from the secondary position data according to a predefined deviation criterion. The secondary position data can be, for example, odometry data, wherein, based on a known initial position (the exit point of the initial travel track), the actual position is determined based on the revolutions of the drive wheels as well as based on the steering angle. This method, depending on the soil condition, can itself be imprecise so that a certain deviation between the GNSS position data and the secondary position data is to be taken into account always. However, it is possible to determine a deviation criterion that is viewed as an indication of a faulty function of the turn steering action. This means that the deviation of the position data is excessive, i.e., surpasses significantly the expected value, so that a faulty function can be assumed. In this case, the turn steering action is deactivated. In addition, a notification can be issued to the user. The agricultural machine can be automatically stopped, for example, until the user continues to steer it manually. It could also be attempted to terminate the automatic travel in the headland by means of secondary position data, essentially by means of an auxiliary turn steering action that employs the secondary position data (for example, odometry data) instead of the GNSS position data.

The object is furthermore solved by an agricultural machine which is automatically steerable by means of a track steering action that is independent of GNSS position data as well as by means of a turn steering action which is configured to steer the agricultural machine based on an actual position of the agricultural machine determined based exclusively on GNSS position data, wherein the agricultural machine:
  can be steered by means of the track steering action along an initial travel track in a working region until the headland adjoining the working region is reached at the exit point of the initial travel track;
  can be steered by means of the turn steering action through the headland until the entry point of a target travel track in the working region is reached;
  can be steered along the target travel track by means of the track steering action.

According to the invention, the agricultural machine is configured to automatically detect at least a transition between a travel track and the headland and, based thereon, switch automatically between turn steering action and track steering action.

The terms mentioned here have already been explained above in relation to the steering method according to the invention and are therefore not explained again. Advantageous embodiments of the agricultural machine according to the invention correspond to those of the steering method according to the invention. In particular, it is preferred that the turn steering action is configured to steer the agricultural machine based on an actual position of the agricultural machine that is determined based exclusively on uncorrected GNSS position data.

In the following, the invention will be explained with the aid of Figures. The Figures show only examples and do not limit the general inventive concept.

DESCRIPTION OF THE PREFERRED EMBODIMENTS

Figure 1:
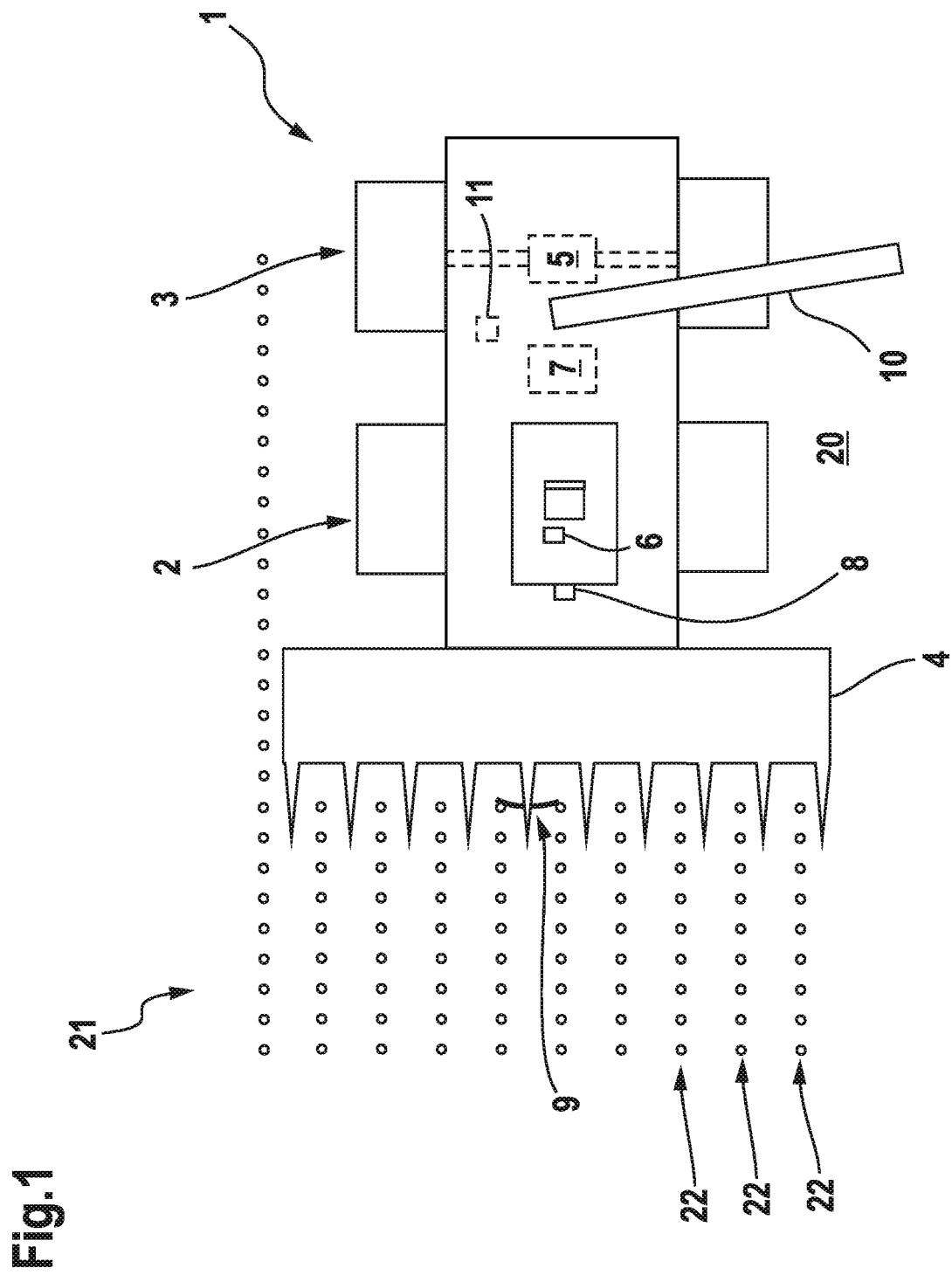
FIG. 1 is a plan view of an agricultural machine according to the invention within a field.

FIG. 1 shows a plan view of an agricultural machine according to the invention, more precisely a forage harvester 1. The illustration is schematic and greatly simplified for reasons of clarity. Wheels of a front axle 2 as well as a steerable rear axle 3 can be seen. Of course, alternatively or additionally also the front axle could be steerable. A front attachment 4 serves for harvesting and processing crop which by means of a pivotable delivery chute 10 can be transferred to a transport vehicle, not illustrated, traveling alongside the agricultural machine. A steering actor 5 serves for adjusting a steering angle of the rear axle 3 and can be operated hydraulically or electrically, for example. The steering actor 5 can be controlled by the driver of the forage harvester by an operating element 6, for example, a joystick or a steering wheel. Also, an automatic control unit 7 is connected to the steering actor 5 and can control the latter. The control unit 7 can be connected to various sensors, for example, a camera 8 that covers at least the region in front of the forage harvester, a row sensor 9 which is arranged at the front attachment 4, and other sensors, not illustrated here. Also, control unit 7 is connected to a GNSS receiver 11 by means of which it receives signals of various navigation satellites. Based thereon, the control unit 7 can calculate uncorrected GNSS position data of the forage harvester 1. The position data are based exclusively on the signals of the satellites and not on signals of a terrestrial base station. They are subject to a drift which leads, even for optimal reception, to an imprecision of a few meters and a corresponding possible deviation of a detected actual position PI from the true position of the forage harvester 1.

Figure 2:
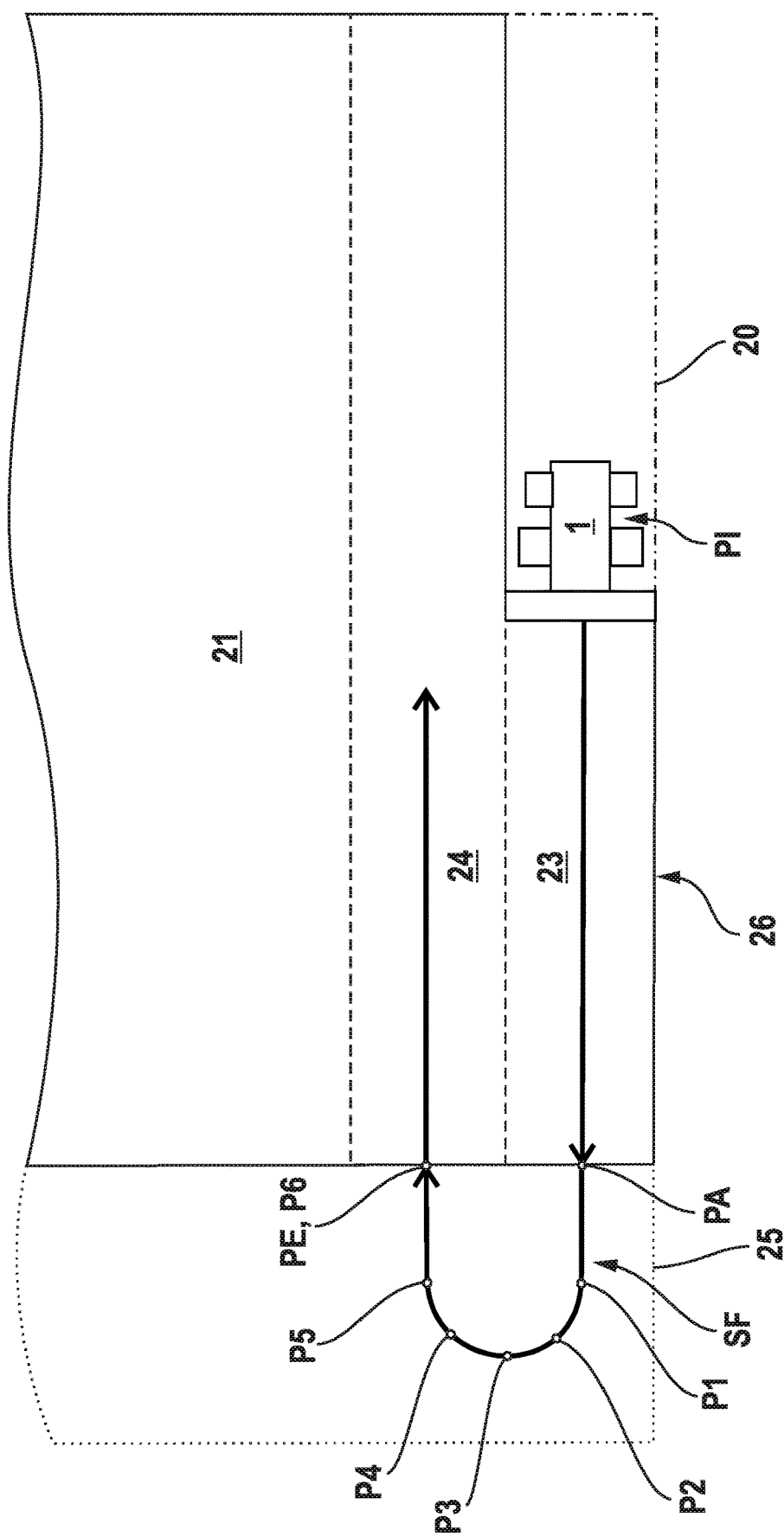
FIG. 2 is a plan view of a larger portion of the field with the agricultural machine as well as with a travel track of the agricultural machine.

FIG. 2 shows the forage harvester 1 in a working region, more precisely in a field 20 which is delimited at the boundary by a headland 25. When working the field 20, the forage harvester 1 travels successively along a plurality of parallel travel tracks 23, 24 that are parallel to the plant rows 22 of a crop 21 (for example, corn). Within a travel track 23, 24, the plant rows 22 as a structure of the standing crop 21 can provide orientation for steering of the forage harvester 1. Alternatively, an orientation along an actual crop boundary 26 would be possible also.

Figure 3:
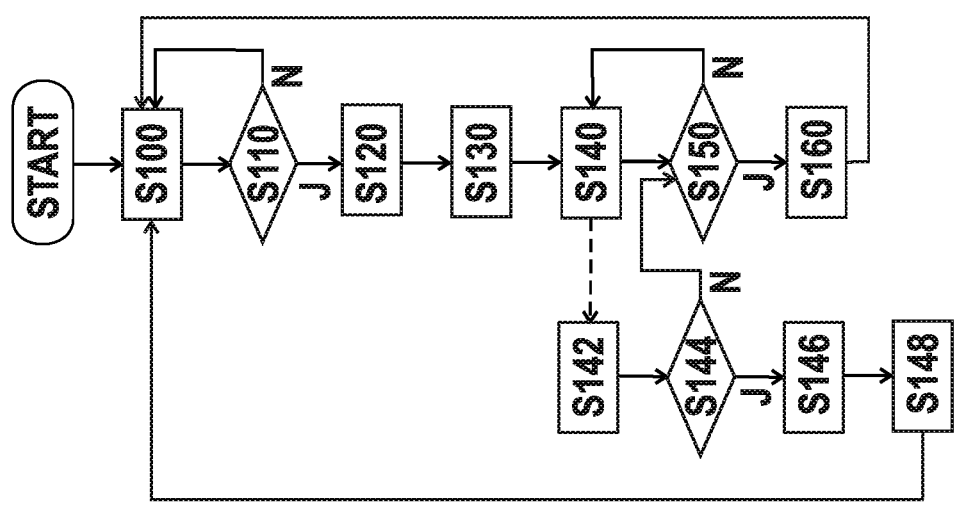
FIG. 3 shows a flowchart of a steering method according to the invention for steering the agricultural machine of FIG. 1.

As illustrated in the flowchart of FIG. 3, the forage harvester 1 is initially steered, in step S100, by a track steering action along an initial travel track 23. The track steering action could be based on manual steering by means of the operating element 6. Alternatively, it could also be realized automatically by the control unit 7 that, for example, evaluates the images of the camera 8 based on image recognition and recognizes thereby whether the actual travel line of the forage harvester 1 follows the plant rows 22 and/or the crop boundary 26. The control unit 7 could also recognize based on the signals of the row sensor 9 whether the forage harvester 1 follows the course of the plant rows 22. In case of a recognized deviation from the intended travel line, the control unit 7 controls the steering actor 5 in order to perform a correction. It is continuously or repeatedly checked in step S110 whether an exit point PA of the initial travel track 23 has been reached. This can be done, for example, by image recognition, by means of the row sensor 9 that at the end of the crop 21 no longer can detect any crop, or by means of a changing position of pressing rollers. Other criteria are also conceivable, for example, processes initiated by the driver such as lifting the front attachment 4, pivoting of the delivery chute 10, or a change of the steering angle (in case of manual steering). In addition to automatic checking, the driver himself can also check, for example, by observing the environment, whether the exit point PA of the initial travel track 23 has been reached. When the exit point PA has not yet been reached, the method returns to step S100 and steering is continued by means of the track steering action (manually or automatically).

Once the exit point has been reached, in step S120 a turn steering action is activated. This can be done manually by the driver or automatically by the control unit 7. In the here illustrated example, the track steering action (inasmuch as it is automatically operating) as well as the turn steering action are realized by a single control unit 7; however, different spatially separated hardware components could be used at least partially for the two steering actions. After its activation, the turn steering action in any case operates automatically or autonomously in the sense that it is operating without input of the driver.

The turn steering action determines first in step S130 a nominal travel line SF through the headland 25 from the exit point PA of the initial travel track to the entry point PE of a targeted travel track 24 (in this case, an immediately adjoining one). For this purpose, first the relative position of the entry point PE in relation to the exit point PA is determined. This can be done, for example, by image recognition or in that, based on a field record system, the course of the boundary of the field 20 at the actual position of the forage harvester 1 is determined. Since the course of the boundary normally does not change within a few meters, the precision of the uncorrected GNSS position data is sufficient in order to determine an approximate absolute position for the field record system. When the boundary course is known, a displacement along the boundary is determined which corresponds to the width of the front attachment 4. After the entry point PE has been determined, the nominal travel line SF is determined such that a minimal possible turning radius of the forage harvester 1 is not undershot and the nominal travel line SF does not leave the headland 25.

In FIG. 2, a semi-circular nominal travel line SF is illustrated but the nominal travel line SF could also be more complicated. A plurality of nominal positions P1-P6 along the nominal travel line SF are determined which are computed based on the actual position P1 at the exit point PA. The nominal positions P1-P6 are thus determined relative to the actual position PI at the exit point PA and comprise inter alia a considerable deviation from the actual absolute positions due to the drift of the GNSS position data. This is however not important for the navigation along the nominal travel line SF as long as the drift does not become (considerably) noticeable during the turning process. This can be assumed because the turning process is performed within approximately 10 seconds. In this context, the turn steering action, in step S140, steers the forage harvester in that it repeatedly determines the actual position based on the uncorrected GNSS position data and compares the actual position to the nominal positions. In case of a considerable deviation, the control unit 7 corrects the steering angle by means of the steering actor 5. Also, the control unit checks in step S150 whether the entry point PE has already been reached. This can be done again by image recognition or by means of the row sensor 9 which at the entry point PE will contact crop again for the first time. A further criterion would be reaching the nominal position P6, determined beforehand, that corresponds to the entry point PE. Finally, checking could also be done by the driver. When the entry point has been reached, in step S160 the turn steering action is deactivated, automatically or manually by the driver, and the track steering action is activated again.

In case of a faulty function of the turn steering action due to faulty GNSS position data, secondary position data can be detected optionally in step S142, for example, by odometry, in that the steering angle as well as revolutions of the wheels are monitored and thus an approximate position is computed. These secondary position data are compared to the GNSS position data. In this context, at S144 based on the previously determined deviation criterion it is decided whether the GNSS position data and the secondary position data deviate excessively from each other. If NO, the turn steering action is continued normally with step S150. If YES, at S146 the automatic track steering action based on the GNSS position data is deactivated and the driver can be provided with a notification that the headland is to be traveled by manual steering in step S148. If NO, the method continues with step S150.

After reaching the entry point PE and deactivation of the turn steering action, the forage harvester 1 is steered by means of the track steering action through the target travel track 24, i.e., the method returns to S100. This applies also in case the driver has steered the forage harvester 1 manually through the headland 25 in step S148.

In the here explained example, the turn steering action determines the actual position PI based exclusively on uncorrected GNSS position data. Alternatively, also corrected GNSS position data could be used that utilize, for example, terrestrial signals of a correction service provider. In this case, no (noticeable) drift is to be taken into account. Since however steering is done independent of the GNSS position data in the travel tracks 23, 24, fees for utilizing the terrestrial signals can be significantly reduced, for example.

The specification incorporates by reference the entire disclosure of German priority document 10 2021 111 360.1 having a filing date of May 3, 2021.

While specific embodiments of the invention have been shown and described in detail to illustrate the inventive principles, it will be understood that the invention may be embodied otherwise without departing from such principles.

What is claimed is:

1. A steering method for an agricultural machine, the method comprising:
   steering the agricultural machine by a track steering action, which is independent of GNSS position data, along an initial travel track in a working region until a headland adjoining the working region is reached at an exit point of the initial travel track;
   automatically steering the agricultural machine by a turn steering action, configured to steer the agricultural machine based on an actual position of the agricultural machine that is determined based exclusively on GNSS position data, through the headland until an entry point of a target travel track in the working region is reached;
   steering the agricultural machine by the track steering action along the target travel track; and
   determining secondary position data and deactivating the turn steering action when the GNSS position data deviate excessively from the secondary position data in accordance with a predefined deviation criterion.

2. The method according to claim 1, further comprising using exclusively uncorrected GNSS position data for determining the actual position of the agricultural machine.

3. The method according to claim 1, further comprising determining a nominal travel line extending from the exit point of the initial travel track to the entry point of the target travel track and automatically steering the agricultural machine through the headland along the nominal travel line.

4. The method according to claim 3, further comprising determining a plurality of nominal positions along the nominal travel line, starting at the actual position of the agricultural machine determined at the exit point, and comparing the plurality of nominal positions with a respectively determined actual position upon traveling through the headland.

5. The method according to claim 1, further comprising manually controlling the track steering action at least temporally.

6. The method according to claim 1, further comprising automatically controlling the track steering action at least temporally.

7. The method according to claim 1, further comprising using a structure of the working region as an orientation for the track steering action in at least one travel track of the working region.

8. The method according to claim 1, further comprising using a mechanical row sensor as an orientation for the track steering action in at least one travel track of the working region.

9. The method according to claim 1, further comprising using an optical image recognition system as an orientation for the track steering action in at least one travel track of the working region.

10. The method according to claim 1, further comprising automatically detecting a transition from a travel track of the working region into the headland and, upon detecting said transition, switching from the track steering action into the turn steering action.

11. The method according to claim 10, further comprising automatically detecting a transition from the headland into a travel track of the working region and, upon detecting the transition from the headland into a travel track of the working region, switching from the turn steering action into the track steering action.

12. The method according to claim 1, further comprising automatically detecting a transition from the headland into a travel track of the working region and, upon detecting said transition, switching from the turn steering action into the track steering action.

13. An agricultural machine configured to be steered by a track steering action that is independent of GNSS position data and further configured to be automatically steered by a turn steering action configured to steer the agricultural machine based on an actual position of the agricultural machine that is determined based exclusively on GNSS position data, wherein the agricultural machine is configured to be steered:

by the track steering action along an initial travel track in a working region until a headland adjoining the working region is reached at an exit point of the initial travel track;

by the turn steering action through the headland until an entry point of a target travel track is reached at the working region; and by the track steering action along the target travel track;

wherein the agricultural machine is configured to automatically detect a transition from a travel track of the working region into the headland and switch from the track steering action into the turn steering action, and/or to automatically detect a transition from the headland into a travel track of the working region and switch from the turn steering action into the track steering action; and wherein the agricultural machine is configured to determine secondary position data and to deactivate the turn steering action when the GNSS position data deviate excessively from the secondary position data in accordance with a predefined deviation criterion.

14. The agricultural machine according to claim 13, wherein the actual position of the agricultural machine is determined by using exclusively uncorrected GNSS position data.

* * * * *